March 25, 1947. R. G. TURNER 2,417,997
ELECTRIC WEFT DETECTOR FOR LOOMS
Filed Feb. 23, 1946
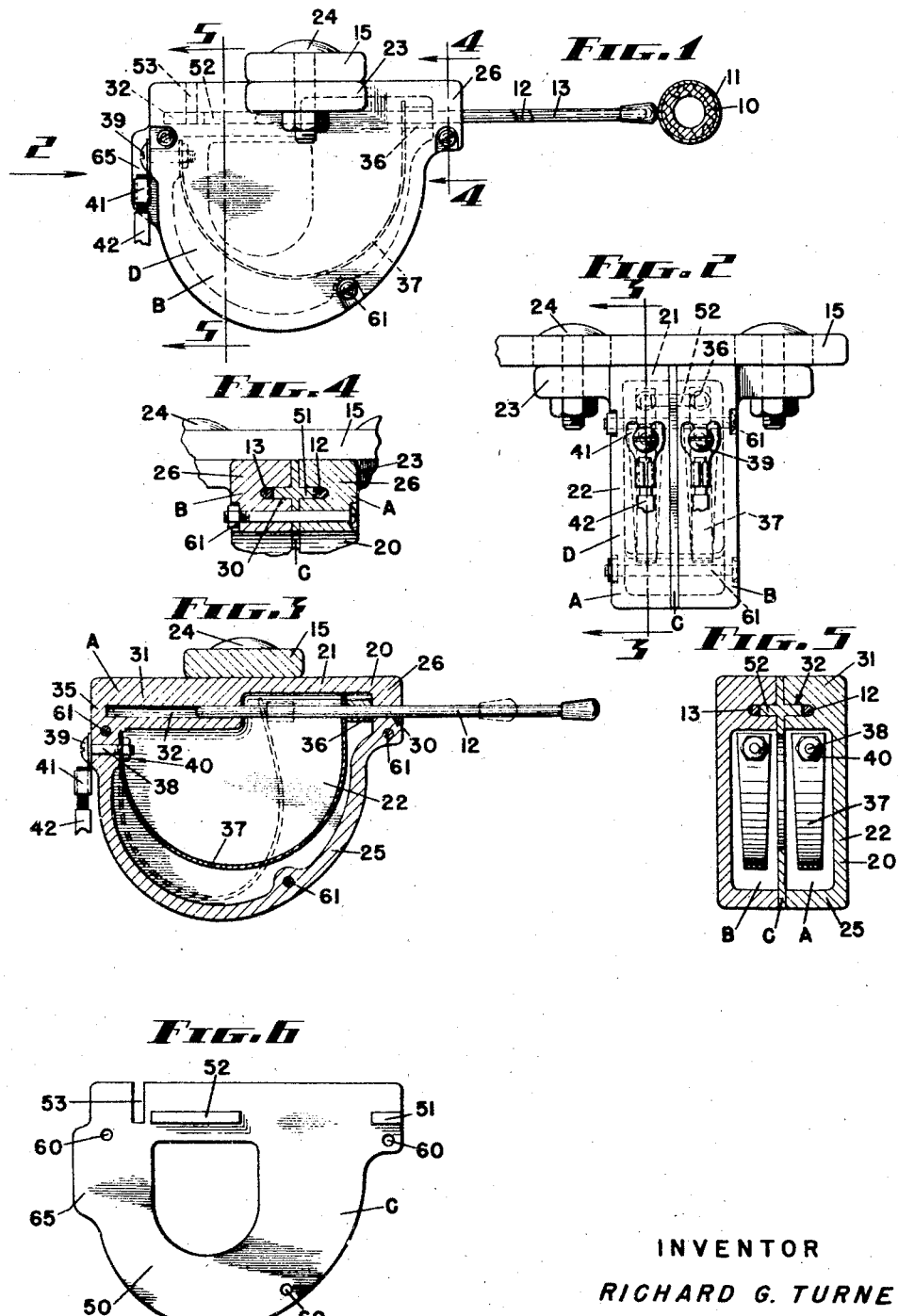
INVENTOR
RICHARD G. TURNER
Chas. T. Hawley
ATTORNEY Patented Mar. 25, 1947

2,417,997

UNITED STATES PATENT OFFICE 2,417,997

ELECTRIC WEFT DETECTOR FOR LOOMS

Richard G. Turner, Worcester, Mass., assignor to Crompton & Knowles Loom Works, Worcester, Mass., a corporation of Massachusetts Application February 23, 1946, Serial No. 649,609

14 Claims. (Cl. 139—273)

This invention relates to electric weft detectors for looms and it is the general object of the invention to provide a simple and cheap detector which can be built up of units similar to each other and each provided with its own detector finger, spring therefor and binding post for the detector circuit.

A type of electric weft detector which has gone into extensive use employs a base or body of insulating material in which two detector fingers in the form of wires are slidably mounted. As heretofore made wear or damage to that part of the base corresponding to one of the wires has necessitated discarding the entire base. It is an important object of my present invention to provide each detector wire with its own guide means and secure the guide means for the two detector wires together in such manner that if injury or wear damages one part it can be discarded without loss of the other part.

It is another object of my present invention to form the detector in such manner that it can be molded of insulating material, such as plastic, and have the guides or slide bearings for the detector wires or fingers molded at the time of manufacture of the unit.

It is another object of my present invention to provide a weft detector made of two separate units each having an outer wall and each having its own detecting parts, together with a partition or separating wall to be located between the units so that in effect each set of detecting parts operates in its own compartment without danger of interference with the other set of detecting parts.

With these and other objects in view which will appear as the description proceeds, my invention resides in the combination and arrangement of parts hereinafter described and set forth.

In the accompanying drawings wherein a convenient embodiment of my invention is set forth, Fig. 1 is a side elevation of a weft detector made according to my present invention, Fig. 2 is a front elevation looking in the direction of arrow 2, Fig. 1, Fig. 3 is a vertical section on line 3—3 of Fig. 2, Fig. 4 is an enlarged vertical section on line 4—4 of Fig. 1, Fig. 5 is a vertical section on line 5—5 of Fig. 1, and Fig. 6 is a side elevation of the separator or partition between the two units.

The detector D forming the subject matter of my present invention is adapted for use with a bobbin 10 having a metallic ferrule 11 which is normally covered with weft but which is uncovered as weft exhaustion approaches. The ferrule is adapted for contact with two detector fingers or wires 12 and 13 which may be somewhat similar to detector fingers heretofore used. When the two fingers contact the exposed ferrule 11 they are electrically connected and by means of electric conducting means to be described hereinafter a detector circut not shown is closed. The loom is provided with a support 15 by means of which the detector is held in detecting position.

The detector forming the subject matter of my present invention comprises three separate parts, two similar units A and B and a partition or separator plate C. Since the units A and B are similar except that they are of opposite hand, only one of them will be described in detail. The unit A comprises a casing 20 made of insulating material, such as a plastic, and may be molded. The casing 20 is provided with a top wall 21 and a side wall 22 from which extends an attaching lug 23 disposed under the support 15 and secured to the latter by a bolt 24.

The casing 20 is provided with a flange 25 which extends laterally from the side wall 22 and is enlarged at its upper rear end to form a rear bearing 26. A slot 30 is formed in the bearing 26 and extends away from the wall 22 and opens in a direction away from wall 22. The forward upper part of the top wall 21 is thickened to form a front bearing 31 in which is formed another slot 32 similar to slot 30 and also opening in a direction away from the wall 22. The two slots 30 and 32 are aligned and the forward end of detector finger 12 is slidable in the front slot 32 while the rear part of the detector finger slides in slot 30. The slot 32 preferably is closed by a front wall 35 formed integral with the body 20 and as a continuation of flange 25.

A collar 36 is secured to the detector finger 12 and is located in front of bearing 26 and receives the rearward thrust of a sheet metal bowed spring 37 the rear upper end of which surrounds the detector finger 12 while the forward end thereof is held to the wall 35 by a small screw or bolt 38 having a slotted outer head 39 and a nut 40. The latter holds the front end of the spring 37 tightly against the wall 35. A binding post or similar electric fitting 41 is held under head 39 and connects with a wire 42 forming part of the detector circuit not shown. The spring 37 extends along the wall 22 and is located within the outline of the casing 20 and normally acts to hold the finger 12 in rear detecting position as shown in full lines in Fig. 3. Spring 37 may be wider at its front end than at the rear end thereof.

When assembling the unit A the spring 37 will be attached to casing 20 by the bolt 38 and the forward end of finger 12 will then be passed through the upper end of spring 37, after which the collar 36 will be moved to a position in front of bearing 26. The finger 12 will then be moved into the slots 30 and 32 by a movement toward the outer wall 22. Spring 37 will tend to hold the finger 12 in position on the casing.

After both the units A and B have been made as already described they are placed on opposite sides of the separator C which has a thin vertical sheetlike body 50 made of insulating material, such as a plastic. Extending on opposite sides of the web 50 is a pair of rear lugs 51 aligned with a similar front pair of lugs 52. These lugs fit respectively into the slots 30 and 32. If desired a small vertical slot 53 may be provided in the forward upper part of the element C and extend down far enough to open into the slots 32 of the two units A and B for the introduction of a light lubricant. The lugs 51 and 52 are of such width that they form guides for the detector fingers 12 and 13, and cooperate with the inner ends of the slots 30 and 32 to form slide bearings for the fingers.

The units A, B and C are provided with aligned perforations 60 to receive screws or bolts 61 by which the units and partition are held together. Unit C may have a forward extension 65 serving to separate the electrical parts 39, 41 and 42 of the two units A and B.

It is believed that the manner of assembling the detector and its operation will be obvious from the foregoing description and the drawings. The detector D will be held in fixed position and at each detecting operation the fingers 12 and 13 and the springs 37 will be moved from the full line to the dotted line position shown in Fig. 3. When the detector engages a bare ferrule 11 the fingers 12 and 13 will be electrically connected and initiate a change in loom operation in well-known manner. The partition unit C prevents contact between the springs 37 of the two units A and B.

From the foregoing it will be seen that I have provided a simple form of electric weft detector comprising two similar detector units each having a detector finger, a spring therefor, and connections for an external circuit. These units are made preferably of an insulating material such as a plastic and each may be provided with a supporting lug 23. The partition unit C separates the spring compartments of the two units A and B and effectively prevents contact between the springs 37. Furthermore, if desired, the partition may be provided with a slot 53 affording access to the slots 32 for the introduction of a light lubricant. The lugs 51 and 52 cooperate with their respective slots 30 and 32 to define guides and slide bearings for the detector fingers 12 and 13. All three units are held together by the detachable bolts or screws 61 so that if either of the units A or B becomes worn or damaged it can be replaced without loss of the other.

Having thus described my invention it will be seen that changes and modifications may be made therein by those skilled in the art without departing from the spirit and scope of the invention and I do not wish to be limited to the details herein disclosed, but what I claim is:

1. In an electric weft detector for looms, a pair of similar units each including a casing made of insulating material, each casing having aligned open bearing slots therein opening toward similar aligned bearing slots in the other casing, a partition formed of insulating material between said units and having portions thereof entering said slots, a detector element slidably mounted in the slot of each casing between the latter and the partition, and means securing said casings and partition together.

2. In an electric weft detector for a loom, a pair of similar units each including a casing formed of insulating material, each casing having front and back bearing slots opening toward and registering with similar bearing slots in the other casing, a partition between said casings having laterally projecting lugs entering said slots, an electric detector finger slidably mounted in the front and back slots of each casing and between the latter and corresponding lugs of the partition, and means holding said units and partition together.

3. In an electric weft detector for a loom, a pair of similar units each including a casing made of insulating material, each casing formed with open slide bearing means opening toward and registering with a similar slide bearing means on the other casing, an electric conducting finger in the slide bearing means of each casing, slide bearing members made of insulating material, one for each casing, each bearing member entering the open bearing means of the corresponding casing and cooperating with the latter to confine the associated finger to the slide bearing means corresponding thereto, and means securing said units and bearing members together.

4. In an electric weft detector for a loom, a pair of similar units each including a casing made of insulating material, each casing having open slide bearing means opening toward and registering with similar open slide bearing means in the other casing, an electric weft detector slidably mounted in the slide bearing means of each casing, a partition between said units made of insulating material and having portions thereof entering the open slide bearing means, said portions cooperating with said casings to confine said fingers in their respective slide bearing means, and means holding said casings and partition together to form a unitary detector structure.

5. In an electric weft detector for a loom, a pair of similar units each including a casing made of insulating material, each casing having open slide bearing means opening toward and registering with similar open slide bearing means in the other casing, an electric weft detector slidably mounted in the slide bearing means of each casing, a partition between said units made of insulating material and having portions thereof entering the open slide bearing means, said portions cooperating with said casings to confine said fingers in their respective slide bearing means, said portions also preventing relative movement of said units in directions transverse of said slide bearing means, and means holding said casings and partition together to form a unitary detector structure.

6. In an electric weft detector for a loom, two similar units each including a casing formed of insulating material, a partition made of insulating material between said casings, said partition and casings having cooperating parts forming slide bearings, one slide bearing for each casing, an electric detector finger for each casing slidably mounted in the slide bearing thereof, and means holding said casings and partition together in fixed position relatively to each other.

7. In an electric weft detector for a loom, a pair of similar units each having a casing made of insulating material, a partition made of insulating material located between said casings and cooperating with the latter to form slide bearings, one for each casing, an electric detector finger slidably mounted in the slide bearing of each casing, a binding post on each casing for the corresponding detector finger, said partition extending between said binding posts, and means holding said units and partition together to form an assembled detector structure.

8. In an electric weft detector for a loom, two similar units each including a casing made of insulating material, an electric detector finger slidably mounted on each casing, spring means mounted on each casing and having electric contact with the corresponding finger and urging the latter toward detecting position, a binding post on each casing in electric contact with the associated spring means, and a partition of insulating material between said casings separating said spring means and said binding posts.

9. In an electric weft detector for a loom, two similar units each including a casing made of insulating materials, an electric detector finger slidably mounted on each casing, spring means mounted on each casing and having electric contact with the corresponding finger and urging the latter toward detecting position, a partition of insulating material between said casings separating said spring means, said partition cooperating with each casing to provide a slide bearing for the corresponding finger, and means holding said units and partition together to form an assembled detector structure.

10. In an electric weft detector for a loom, two similar units each including a casing made of insulating material, an electric detector finger slidably mounted on each casing, spring means mounted on each casing and having electric contact with the corresponding finger and urging the latter toward detecting position, and a partition of insulating material between said casings separating said spring means, said casings and partitions having interengaging parts resisting relative motion of said casings and partition in a direction transverse of said fingers, and means cooperating with said interengaging parts to hold said casings and partition together.

11. In an electric weft detector for a loom, a pair of similar detecting units each including a casing formed of insulating material, each casing having open slide bearing means, an electric detector finger for each casing in the slide bearing means thereof, a sheet metal spring for each casing having one end thereof held fixed with respect to the casing therefor and having the other end in electric contact with the corresponding finger and urging the latter toward detecting position, a partition made of insulating material between said casings defining with the latter compartments for the springs, one compartment for each spring, means on the partition entering each open slide bearing means to confine the corresponding finger.

12. In an electric weft detector for a loom, two similar units each including a casing formed of insulating material, each casing having a side wall from which bearing means extend laterally toward the other casing, the bearing means of each casing having a slot therein opening toward and registering with a similar slot in the bearing means of the other casing, a partition formed of insulating material between said casings and having laterally extending lugs extending into said slots, an electric detector finger slidably mounted on each casing in the slot thereof between the casing and the corresponding lug on the partition, and means securing said units and partition to each other and maintaining said lugs in their associated slots.

13. In an electric weft detector for a loom, two similar units each including a casing formed of insulating material, each casing having a slide bearing, an electric detector finger slidably mounted in each slide bearing, a partition formed of insulating material between said casings, said partition having an opening therein communicating with each slide bearing for entry of a lubricant, and means holding said casings and partition together as an assembled structure.

14. In an electric weft detector for a loom, a pair of units similar to each other and each including a casing formed of insulating material, each casing having a slot therein registering with and opening toward a similar slot in the other casing, each slot having the forward end thereof closed, an electric detector finger slidably mounted in the rear part of each slot, a partition between said casing, said partition having an open end slot extending downwardly therein and communicating with said slots for entry of a lubricant into said slots, and means holding said casings and partition together as an assembled structure.

RICHARD G. TURNER.

REFERENCES CITED

The following references are of record in the file of this patent:

UNITED STATES PATENTS

| Number | Name | Date |
|---|---|---|
| 692,591 | Baker | Feb. 4, 1902 |
| 1,924,197 | Payne | Aug. 29, 1933 |
| 2,384,979 | Turner | Sept. 18, 1945 |
| 2,392,913 | Geier | Jan. 15, 1946 |

FOREIGN PATENTS

| Number | Country | Date |
|---|---|---|
| 525,997 | German | June 1, 1931 |